Feb. 21, 1967  A. S. ROBINSON  3,305,338
METHOD OF MANUFACTURING FLAT GLASS
OF DIFFERENT THICKNESSES
Filed April 1, 1963

Inventor
Albert S. Robinson
By
Morrison Kennedy Campbell Attorneys

United States Patent Office 3,305,338
Patented Feb. 21, 1967

3,305,338
METHOD OF MANUFACTURING FLAT GLASS OF DIFFERENT THICKNESSES
Albert Sidney Robinson, Birkdale, Southport, England, assignor to Pilkington Brothers Limited, Liverpool, England, a corporation of Great Britain
Filed Apr. 1, 1963, Ser. No. 269,591
Claims priority, application Great Britain, Apr. 3, 1962, 12,825/62
1 Claim. (Cl. 65—99)

This invention relates to the manufacture of flat glass in continuous ribbon form.

In order to produce a ribbon of glass of a desired thickness molten glass is flowed at a controlled rate to the pass between a pair of metal (usually steel) sizing rolls of a length greater than the width of the ribbon and mounted for mutual adjustment, to regulate the distance between their peripheries, in a plane containing their axes. This distance is adjusted to produce the desired thickness in the ribbon emerging from the pass between the rolls and permits ribbons to be produced at all commercial thicknesses. These rolls are alternatively referred to as casting rolls or sizing rolls, and the operation is generally referred to as "sizing."

If a polished ribbon is required the ribbon, after being annealed, is progressively mechanically ground and polished.

During the operation of sizing the ribbon, the glass passes in intimate contact with the metal of the two rolls and accordingly a heat exchange is effected between the surface of the ribbon and the rolls, so that the surfaces of the glass are cooled by loss of heat due to heat transfer to the rolls and thus stiffened and are permanently harmed by their contact with the rolls, since any imperfections, even of micro-character, are imparted to the hot glass and made permanent as the glass cools. Accordingly, if polished glass is required, the ribbon must be mechanically surfaced in order to eliminate the imperfections imparted by the rolls and to obtain parallel flat suraces on a polished ribbon.

The rate of production of a continuous ribbon of glass by feeding molten glass to the sizing rolls is necessarily limited in order to prevent the glass being insufficiently cooled as it emerges from the roll and wrapping itself around one of the sizing rolls.

The aforesaid sizing method is well known in the production of transparent soda lime silica glasses in various thicknesses and also in the manufacture of opaque or opalescent glasses with a lustrous surface, for example that opaque glass known on the market under the registered trademark "Vitrolite."

A main object of the present invention is to provide improvements in the manufacture of flat glass in continuous ribbon form having a fire-finished surface and in different thicknesses as desired.

The present invention involves a novel principle of operation in which, to obtain the desired thickness, a mobile layer of molten glass is thermally treated to enforce such a viscosity change as to stop lateral flow of the layer when the desired thickness for the glass to be produced is reached.

The lateral flow which occurs is engendered by the forces of surface tension and gravity acting on the mass of glass present, and if the layer is so shallow that forces acting on the glass due to the weight of the glass in the layer are less than the forces of surface tension acting on the surface of the glass, the forces of surface tension initially take control and the lateral flow will be a contraction in width of the layer, whereas if the depth of the layer is so great that spreading forces due to the weight of glass prevail then the lateral flow will be a spreading or widening of the layer.

In either case, according to the invention the thermal control arrests the lateral flow when the layer has been given the desired thickness by that permitted flow.

In order that the lateral flow can be free from restraint the layer is preferably provided with a support which is in nature a lubricant for the mobile glass, or presents a surface which is frictionless, or substantially so.

Accordingly the present invention consists in a method of producing flat glass of a prescribed thickness in ribbon form from a layer of molten glass established on a molten bath of higher specific gravity than the glass, under thermal conditions ensuring a lateral flow of the molten layer as the glass is advanced on the bath, metering the rate of feeding glass to the layer so that the edges of the layer never reach the lateral boundaries of the bath, characterized by deliberately increasing the viscosity of the layer as it is advanced along the bath at a rate to arrest lateral flow of the mobile layer at a width which predicates the prescribed thickness for the ribbon to be produced and stabilise the layer at that thickness, continually developing the ribbon from the stabilized glass and advancing the ribbon to the discharge end of the bath.

Preferably the layer is formed on the bath by continually pouring molten glass on to the middle area of the bath at the inlet end at a rate ensuring that the edges of the layer established on the bath never reach the lateral boundaries of the bath.

The present invention also comprises apparatus for producing flat glass in ribbon form on a bath of higher specific gravity than the molten glass, characterised by a tank structure adjacent to a source of molten glass, a bath of molten metal in the tank structure and a channel for delivering molten glass from the said source on to the middle area of the molten bath at the inlet end thereof, the surface of the bath being of greater width than the intended width for the ribbon to be produced, temperature regulators operable to reduce the temperature of the glass longitudinally of the mobile layer established on the bath to increase the viscosity of the glass in the layer as it is advanced and to stabilise the glass at the desired thickness, means for developing the stabilised glass into glass of ribbon form and for advancing the ribbon towards the discharge end of the bath, and cooling the ribbon as it is advanced to enable it to be taken unharmed from the bath. The frictionless support may be the surface of a shallow bath, the specific gravity of which is such that the layer of molten glass is supported as a buoyant element by the bath.

Preferably the bath in which the molten glass is supported is a bath of molten tin or a bath of an alloy of tin having a specific gravity greater than that of the glass.

In one embodiment of the invention the lateral flow which occurs simultaneously at both sides of the mobile layer is progressive from the moment that the layer is established to the moment when the objective thickness in the layer is achieved and at which time the layer is developing into ribbon form of the desired thickness.

In accordance with the invention the mobile layer may be derived from a ribbon of glass which has been fed on to the bath after emerging from a pair of sizing rolls and directed from them to the hot end of the bath, by reconversion of the glass ribbon to molten form by sufficient heat transfer from the non-wetting surface of the bath of molten metal, and/or from heaters mounted in the headspace over the bath.

Preferably, however, molten glass is delivered on to the bath to feed the layer of mobile glass at a rate commensurate with the rate of advance of the glass in ribbon form developed from the mobile layer, the thickness and width of the layer of molten glass delivered on to the bath being such as to cause it to form a layer of a depth greater than that of the ribbon developed on the support and at a temperature which ensures a brilliant surface on the molten glass arriving on the support.

In one practical embodiment the feed end of the bath may be regarded as the hot end but the temperature gradient of the bath may vary as between the feed end and that part at which the mobile layer is established. If a ribbon of glass is fed to the bath there will be an upward temperature gradient up to the stage of establishing the layer from the ribbon and then a downward temperature gradient extending towards the discharge end, whereas if molten glass is delivered to the hot end of the bath there may be a constant temperature up to the point where the mobile layer is established and then a downward gradient, or a downward gradient up to that part of the bath where the ribbon developed from the layer has been sufficiently stiffened to enable it to be discharged unharmed by mechanical conveying means.

In order that the invention may be more clearly understood one preferred embodiment according to the invention will now be described, by way of example, with reference to the accompanying diagrammatic drawings, in which example the mobile layer is established by feeding molten glass on to a bath of molten metal having a higher specific gravity than that of the glass.

In the accompanying diagrammatic drawings

Like reference numerals designate the same parts.

Figure 1:
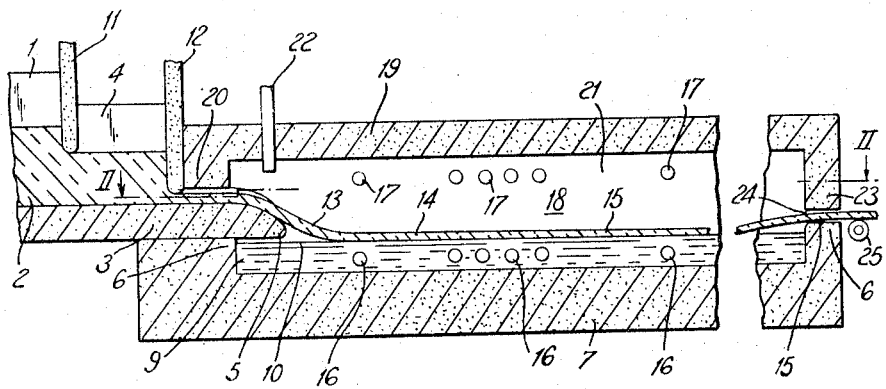
FIGURE 1 is a central vertical sectional elevation.
Figure 2:
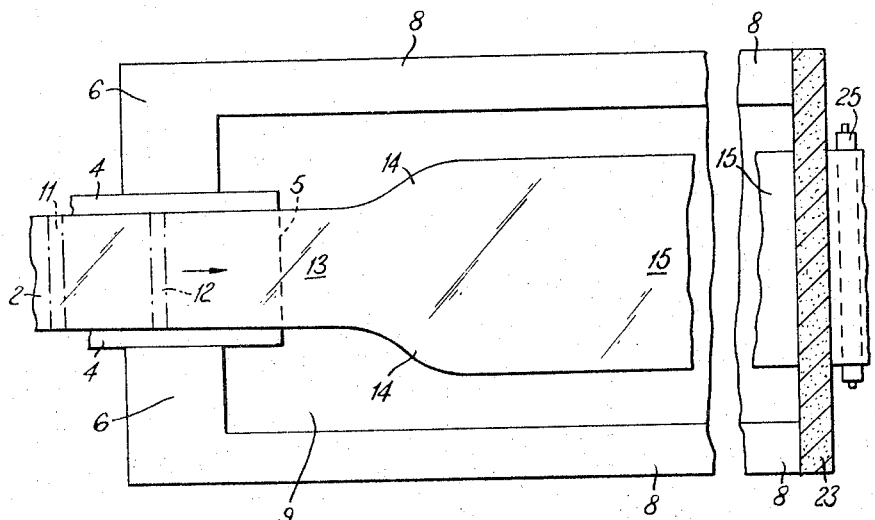
FIGURE 2 is a plan thereof taken on the plane II—II of FIGURE 1 of apparatus constructed for use in carrying out the invention.

In the drawings is illustrated a canal 1 leading from a glass melting furnace (not shown) which canal conducts molten glass 2 obtained from the furnace to an open channel element including a floor 3 and side walls 4, 4 the lip 5 of which floor 3 overlaps the end wall 6 at the inlet end of a tank structure comprising also a floor 7, side walls 8 and an end wall 6 at the discharge end of the bath.

Within the tank structure is confined a bath having a greater specific gravity than glass, e.g., a bath 9 of molten metal having all the characteristics of the bath described in United Kingdom Patent No. 769,692, the surface level 10 of the bath 9 being just below the floor 3 of the channel element.

The molten glass 2 is flowed to the channel element at a controlled rate by adjusting the regulating tweel 11 and gate 12 and generally speaking the width of the floor 3 near the lip 5 is about half the width of the bath and symmetrically disposed thereover.

In operation the metered flow of molten glass moves down the channel element as a continuous layer covering the floor 3 and the layer slides, while at a temperature of, for example, about 950° C., for soda lime silica glass, on to the bath as indicated at 13 where because of the relative thickness of the layer, it spreads progressively and symmetrically on the bath as indicated at 14 under the influence of the forces of gravity and surface tension at the same time progressively decreasing in thickness.

During the spreading of the mobile layer the glass is thermally treated by prevailing conditions of temperature so to increase the vicosity of the glass in a relatively short distance of travel, for example 5 feet when working with soda lime silica glass, that thermal control of the glass is established to brake the mobility of the glass in a direction across the layer as it moves in a lengthwise direction in the part which gives the desired thickness or substance to the ribbon 15 as it is developed from the layer.

The temperature of the molten bath at the hot inlet end is such that in the relatively short distance of travel glass in the layer drops in temperature to a temperature at which it is stabilised sufficiently to stop the lateral flow transversely of the moving layer and thereby fix the maximum width of the mobile layer 14 and in consequence the width and thickness of the ribbon of glass 15 developed from the mobile layer. The temperature range at the hot end will of course vary somewhat according to the composition of the glass; for example when working with soda lime silica glass the temperature falls from about 950° C. to about 850° C. in 5 feet. At the discharge end of the bath the glass is at a temperature of about 600° C.

The floor 3 and side walls 4 of the channel element are preferably heated as will be well understood by those versed in the art of rolling glass, but in any case the temperature of the glass being slid on to the bath is such that it has a brilliant, or what is sometimes termed, a polished surface. Thus a polished ribbon of desired thickness is developed on the bath and advanced to the discharge end thereof.

In order to increase rapidly the viscosity of the molten glass arriving on the bath from the channel element 3, 4, 4, and thereby slow up the spreading of the layer, temperature regulators 16 may be arranged in the bath to ensure the necessary drop in temperature through a short travel of the mobile layer 14, and similar regulators 17 may be arranged in the headspace 18 confined above the bath 9 by a roof structure superimposed on the tank structure, said roof structure comprising a roof 19, end wall 20 at the hot end of the bath, end wall 23 at the discharge end of the bath and side walls 21. Thus the molten glass is supplied at a temperature of about 1,000° C. to the channel element and slides bodily from the channel element at a temperature of about 950° C. on to the bath of molten metal where, as already mentioned, the temperature of the glass is quickly reduced by the thermal regulators by about 100° C. or 150° C. in order that the viscosity of the glass can be soon increased to an extent which arrests the permitted lateral flow of the molten glass in the mobile layer 14.

In order to prevent the formation of contaminants for the glass at the interface between the glass and the bath a protecting gas is maintained at a plenum in the headspace, and to this end ducts 22 may be passed through the roof structure in order to maintain a circulation through the headspace of a protecting gas at the necessary temperature.

It will be appreciated that the vertical end wall 23 of the roof structure at the discharge end corresponding to the end wall 20 at the hot end would be deeper than the end wall 20 at the hot end of the bath and will approach the end wall 6 of the tank structure at the discharge end so as to provide a restricted outlet 24 for the glass and preserve the desired plenum in the headspace. The linear distance between the inlet, or hot end, and the outlet, or discharge end of the apparatus described, may be of the order of 50 feet but will vary according to the throughput of glass and the desired rate of cooling the ribbon of glass produced on the bath.

At 25 is indicated in FIGURE 1 a take-off roller for the ribbon leaving the bath and for directing it to a lehr as described in United Kingdom Patent No. 769,692.

It will be appreciated that whereas in rolling a sheet of glass to a desired thickness polished flat surfaces can only be obtained by mechanical polishing, in methods according to the present invention a ribbon is formed with the thickness desired, and with a polished surface, so that no separate polishing operation is necessary.

I claim:

A method of developing a ribbon of flat glass of a desired thickness from the downstream end of a layer of molten glass maintained on a bath of molten metal of higher specific gravity than that of the glass, by pouring molten glass onto the bath in a direction longitudinally of the bath to feed the layer at a rate to ensure that a lateral flow of the glass in the layer occurs under the influence of surface tension and gravity and to compensate the layer for the glass withdrawn from the layer as a ribbon is developed therefrom, characterized by the steps of (1) cooling the molten glass in the layer before it reaches the limit of its free lateral flow under the influence of surface tension and gravity sufficiently to increase the viscosity of the layer and to stop thereby its lateral flow before it reaches said limit, and before the sides of the layer reach the sides of the bath, whereby the dimensions of the layer are stabilized by the stopping of said lateral flow, (2) continuously developing from the stabilized layer a continuously longitudinally moving ribbon of uniform thickness along its length while supported on said bath, (3) cooling the developed ribbon sufficiently to stiffen it to the point where it can be withdrawn from the bath unharmed, and (4) continuously withdrawing the developed stiffened ribbon from said bath while of said thickness.

References Cited by the Examiner

UNITED STATES PATENTS

| | | | |
|---|---|---|---|
| 710,357 | 9/1902 | Heal | 65—182 |
| 1,564,240 | 12/1925 | Hitchcock | 65—182 |
| 1,884,926 | 10/1932 | Van Ness | 65—182 |
| 3,083,551 | 4/1963 | Pilkington | 65—182 |

S. LEON BASHORE, *Acting Primary Examiner.*

DONALL H. SYLVESTER, *Examiner.*

F. W. MIGA, *Assistant Examiner.*